(12) United States Patent
Fujita et al.

(10) Patent No.: US 12,232,045 B2
(45) Date of Patent: Feb. 18, 2025

(54) COMMUNICATION APPARATUS, COMMUNICATION METHOD, AND PROGRAM

(71) Applicant: Sony Semiconductor Solutions Corporation, Kanagawa (JP)

(72) Inventors: Hiroaki Fujita, Kanagawa (JP); Hiroaki Nakano, Tokyo (JP); Uichiro Omae, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 501 days.

(21) Appl. No.: 17/642,493

(22) PCT Filed: Oct. 14, 2020

(86) PCT No.: PCT/JP2020/038711
§ 371 (c)(1),
(2) Date: Mar. 11, 2022

(87) PCT Pub. No.: WO2021/085127
PCT Pub. Date: May 6, 2021

(65) Prior Publication Data
US 2022/0346026 A1    Oct. 27, 2022

(30) Foreign Application Priority Data
Oct. 28, 2019    (JP) .................................. 2019-195196

(51) Int. Cl.
*H04W 52/18*    (2009.01)
*H04W 52/36*    (2009.01)

(52) U.S. Cl.
CPC ......... *H04W 52/18* (2013.01); *H04W 52/367* (2013.01)

(58) Field of Classification Search
CPC . H04W 52/18; H04W 52/367; H04W 52/262; H04W 52/52; H04W 52/22;
(Continued)

(56) References Cited

U.S. PATENT DOCUMENTS 5,987,307 A * 11/1999 Buskirk ................ H04W 52/52
6,011,980 A *  1/2000 Nagano ................ H04W 52/52
                                                       455/69

(Continued)

FOREIGN PATENT DOCUMENTS

| JP | 2006-054703 A | 2/2006 |
| JP | 2007-065976 A | 3/2007 |
| JP | 2008-008763 A | 1/2008 |

OTHER PUBLICATIONS

International Search Report (PCT/ISA/210), International Application No. PCT/JP2020/038711, dated Nov. 20, 2020.

*Primary Examiner* — Lana N Le
(74) *Attorney, Agent, or Firm* — Michael Best & Friedrich LLP

(57) ABSTRACT

The present disclosure relates to a communication apparatus, a communication method, and a program that enable improvement in performance of short-range wireless communication.

The communication apparatus includes: a reception circuit that receives a signal transmitted by load-modulating in a card, which is a partner in short-range wireless communication, via an antenna; and a transmission power control unit that controls transmission power transmitted to the card on the basis of a reception signal modulation degree which is a modulation degree of the signal received by the reception circuit. Then, the transmission power control unit performs control so as to reduce the transmission power in a case where the reception signal modulation degree is less than or equal to a certain threshold value. The present technology (Continued)

can be applied to, for example, a communication apparatus that performs short-range wireless communication.

19 Claims, 14 Drawing Sheets

(58) Field of Classification Search
CPC . H04W 52/223; H04W 52/226; H04W 52/24; H04W 52/247; H04B 5/72; H04B 5/48
See application file for complete search history.

(56) References Cited

U.S. PATENT DOCUMENTS

| | | | | |
|---|---|---|---|---|
| 6,118,988 A | * | 9/2000 | Choi | H04W 52/18 |
| | | | | 455/522 |
| 2005/0287965 A1 | * | 12/2005 | Gu | H04W 52/24 |
| | | | | 455/127.1 |
| 2007/0183531 A1 | * | 8/2007 | Ahmed | H04W 52/52 |
| | | | | 375/297 |
| 2010/0113105 A1 | * | 5/2010 | Xu | H04W 52/262 |
| | | | | 455/343.1 |
| 2010/0118805 A1 | * | 5/2010 | Ishii | H04W 52/367 |
| | | | | 455/522 |
| 2016/0261314 A1 | | 9/2016 | Cox et al. | |
| 2019/0363807 A1 | * | 11/2019 | Cordier | H04B 5/72 |

* cited by examiner

COMMUNICATION APPARATUS, COMMUNICATION METHOD, AND PROGRAM

TECHNICAL FIELD

The present disclosure relates to a communication apparatus, a communication method, and a program, and particularly to a communication apparatus, a communication method, and a program capable of improving performance of short-range wireless communication.

BACKGROUND ART

Conventionally, near field communication (NFC) has been approved as an international standard for short-range wireless communication technology, and becomes widespread mainly in Asia in fields such as transportation, billing, and authentication. The NFC standard is upward compatible with multiple standards used around the world, such as Type A, Type B, Type F, and ISO15693, and a card and a reader/writer conforming to the NFC standard can correspond to all standards. For example, characteristics such as a bit rate, a modulation method, and a modulation degree are different for each of Type A, Type B, and Type F, and communication performance, ease of clock extraction, and the like also differ depending on the type.

For example, Patent Document 1 discloses a wireless communication apparatus that detects impedance variation of an antenna circuit on a reader/writer side by monitoring a transmission output level, and lowers the output level in conjunction with a case where impedance changes largely.

CITATION LIST

Patent Document

Patent Document 1: Japanese Patent Application Laid-Open No. 2006-54703

SUMMARY OF THE INVENTION

Problems to be Solved by the Invention

By the way, conventionally, cards conforming to the NFC standard can have a large difference in characteristics such as power consumption and a modulation degree depending on each card. (In particular, a modulation degree characteristic from the card to a reader/writer is different depending on a load modulation resistance value, a capacity value, etc. on the card side.) Therefore, in a case where appropriate power cannot be supplied according to the characteristics of each card, there is a concern that performance of short-range wireless communication on the card side deteriorates. Note that this concern is different from an NFC's problem of a large change in impedance due to coupling of two antennas in a case where the cards are in close proximity. Furthermore, even if a method disclosed in Patent Document 1 described above is used, a change in impedance is small on the reader/writer side in a region where coupling of antennas is small to some extent, and this concern cannot be solved.

The present disclosure has been made in view of such a situation, and makes it possible to improve performance of short-range wireless communication.

Solutions to Problems

A communication apparatus according to one aspect of the present disclosure including: a reception circuit that receives a signal transmitted by load-modulating in a communication device, which is a partner in short-range wireless communication, via an antenna, in which the reception circuit measures a modulation degree of the signal.

A communication method or a program according to one aspect of the present disclosure including: receiving a signal transmitted by load-modulating in a communication device, which is a partner in short-range wireless communication, via an antenna, in which a modulation degree of the signal is measured.

In one aspect of the present disclosure, a signal transmitted by load-modulating in a communication device, which is a partner in short-range wireless communication, is received via an antenna, and a modulation degree of the signal is measured.

MODE FOR CARRYING OUT THE INVENTION

Hereinafter, a specific embodiment to which the present technology is applied will be described in detail with reference to the drawings.

Configuration Example of Communication System

Figure 1:
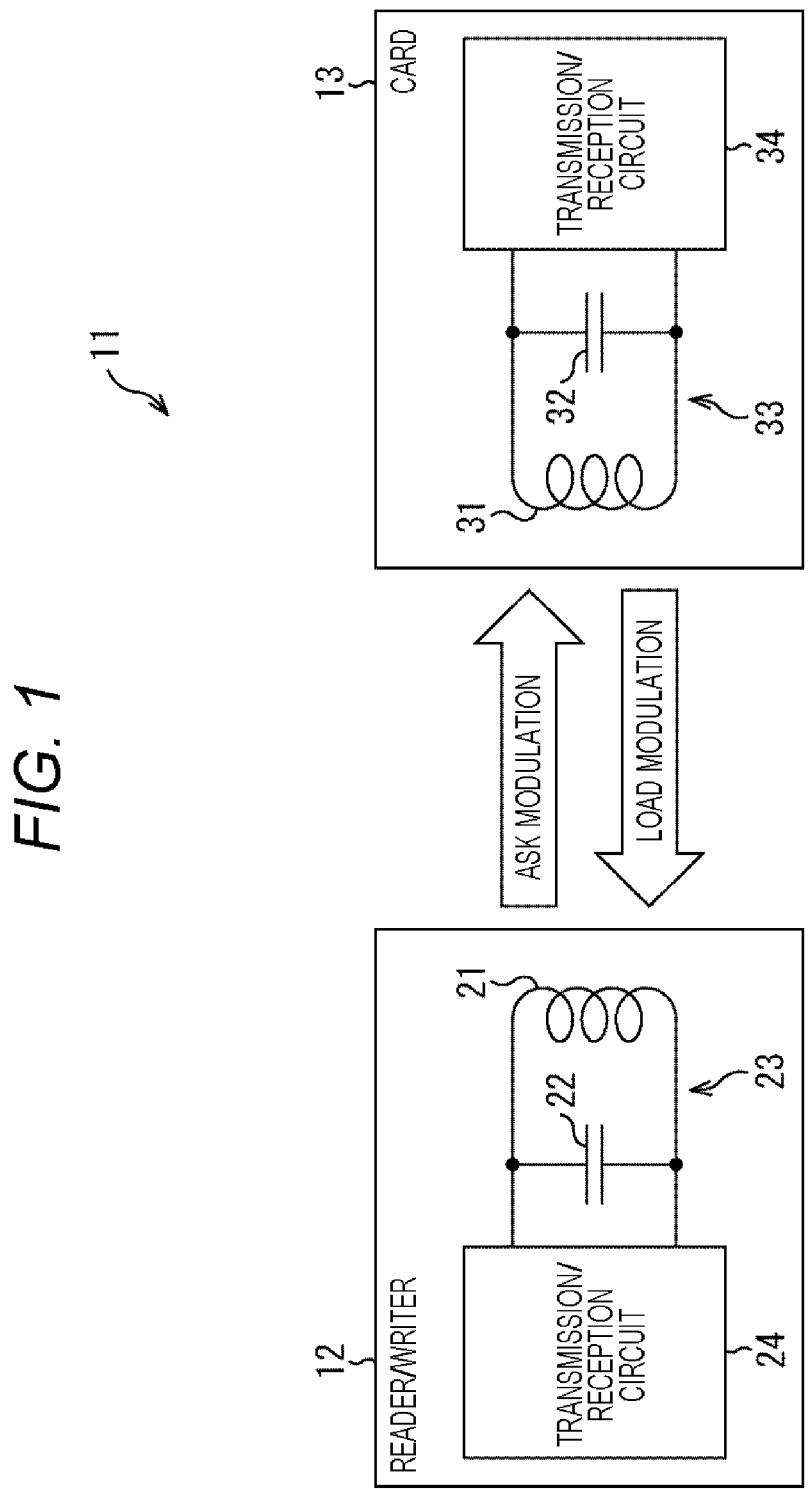
FIG. 1 is a block diagram showing a configuration example of an embodiment of an NFC communication system to which the present technology is applied.

FIG. 1 is a block diagram showing a configuration example of an embodiment of an NFC communication system to which the present technology is applied.

In an NFC communication system 11 shown in FIG. 1, short-range wireless communication using a magnetic field is performed by a reader/writer 12 and a card 13. As shown in the drawing, in the reader/writer 12, an antenna circuit 23 including a coil 21 and a capacitor 22 is connected to a transmission/reception circuit 24. Similarly, in the card 13, an antenna circuit 33 including a coil 31 and a capacitor 32 is connected to a transmission/reception circuit 34.

For example, in the NFC communication system 11, amplitude shift keying (ASK) modulation is used for communication from the reader/writer 12 to the card 13, and load modulation is used for communication from the card 13 to the reader/writer 12. In the load modulation, the magnetic field is changed by turning on/off a load on the card 13, and modulation is confirmed by reading the change by the reader/writer 12.

By the way, in general, a smartphone equipped with an NFC communication function has both functions of the reader/writer 12 and the card 13 shown in FIG. 1, and can perform communication confirming to an NFC standard by switching a reader/writer mode and a card mode. Furthermore, in recent years, active load modulation technology has significantly improved communication performance in the card mode of the smartphone. Therefore, for example, an antenna having a low Q value due to a structure using a metal housing or the like, a small antenna, or the like can have the same performance as a conventional antenna.

On the other hand, in the reader/writer mode of the smartphone, an attempt to have performance similar to the conventional antenna has been made on the antenna having the low Q value, the small antenna, or the like similarly to the card mode by improving performance by increasing power (high voltage, large current, etc.) of a transmission buffer. However, a method of improving the communication performance in the reader/writer mode by increasing the power may not be effective because of cases as described below.

Here, the communication performance in the reader/writer mode will be described with reference to FIGS. 2 to 4. Currently, there are numerous types of cards 13 corresponding to the NFC, and not only there are cards 13 with different types (communication methods) as described above, but also there is a big difference in characteristics such as power consumption and a modulation degree for every type of cards 13.

Figure 2:
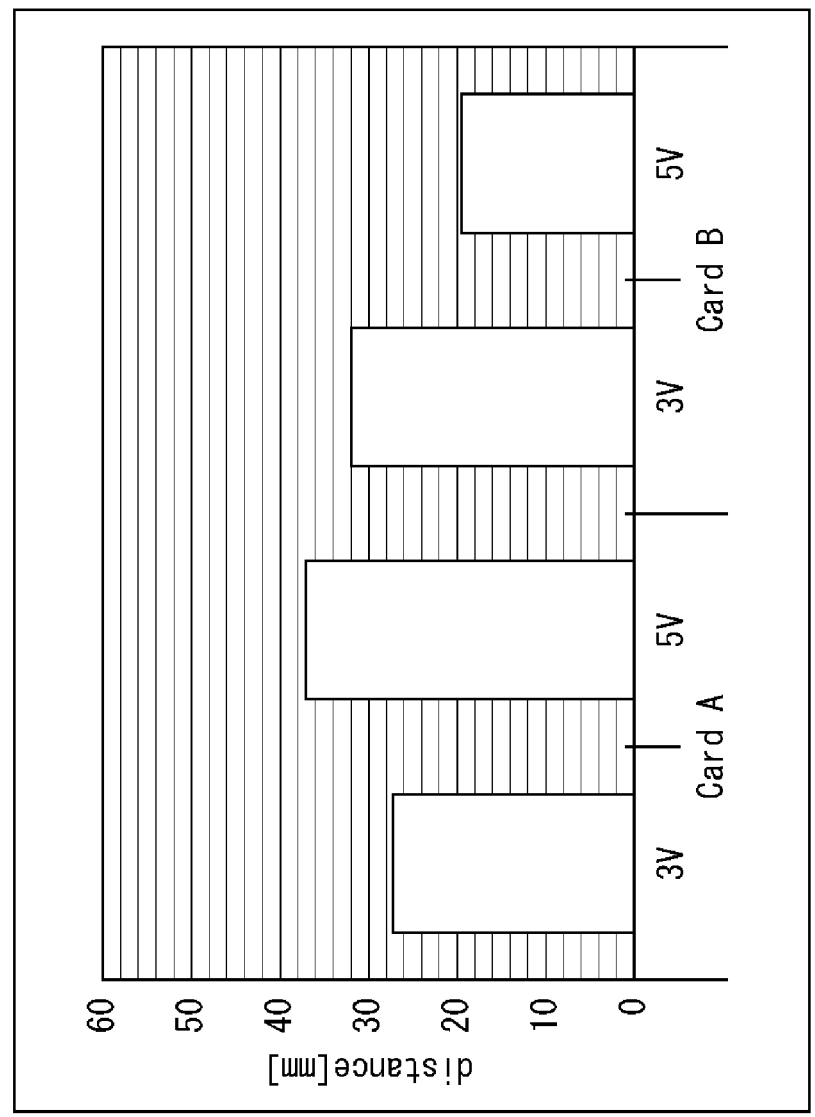
FIG. 2 is a graph showing an example of results of communication performance evaluation.

FIG. 2 shows an example of results of communication performance evaluation of two different types of cards A and B.

For example, it shows that communication performance evaluation has been obtained in which a communicable distance of the card A increases when transmission voltage is increased from 3 V to 5 V, and conversely, the communicable distance of the card B decreases when the transmission voltage is increased from 3 V to 5 V. It is analyzed that this is because factors of communication rate control are different between card A and card B. That is, since the card A consumes a large amount of power, it is considered that the factor of the communication rate control is due to power shortage. On the other hand, the card B consumes a small amount of power and has a small modulation degree when performing load modulation for replying, so that a modulation degree of a reception signal (hereinafter referred to as a reception signal modulation degree) received on a reader/writer side is also small, which is considered to be due to reception failure.

Figure 3:
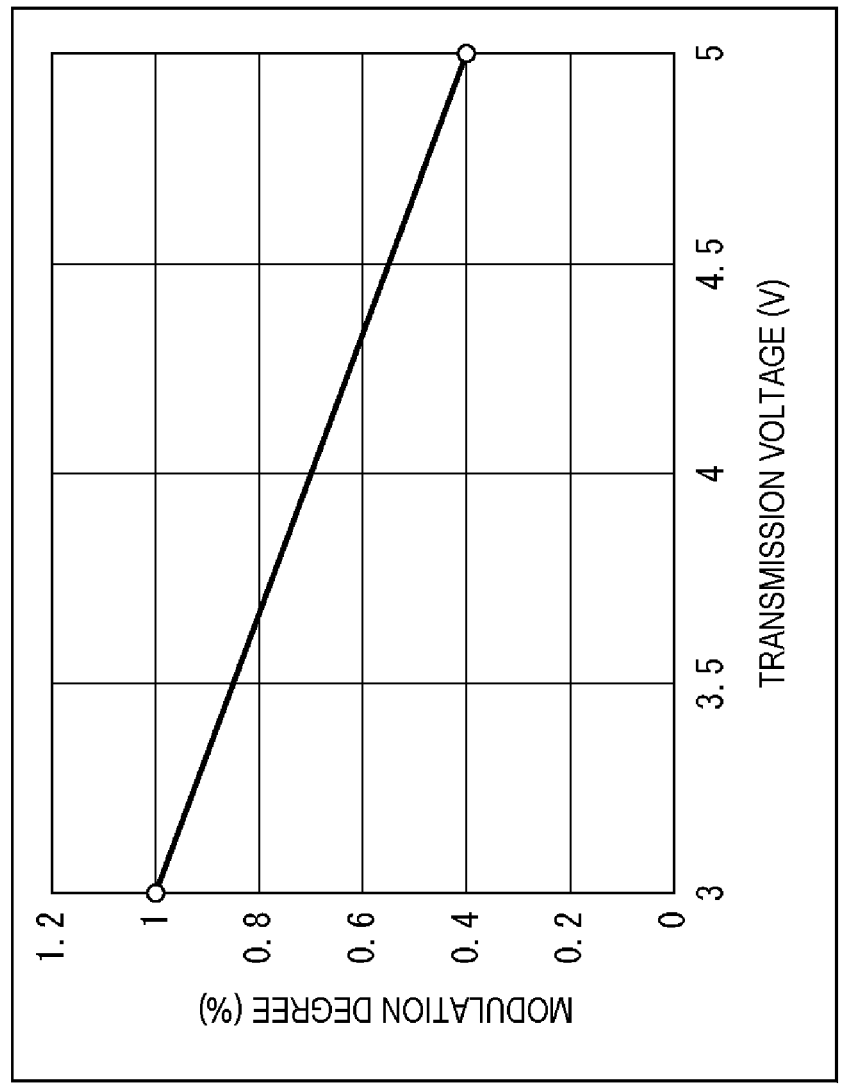
FIG. 3 is a graph showing an example of a relationship between a transmission voltage and a reception signal modulation degree.

Furthermore, FIG. 3 shows an example of a relationship between the transmission voltage and the reception signal modulation degree.

As shown in FIG. 3, it has been measured that when the transmission voltage is increased from 3 V to 5 V, the reception signal modulation degree is decreased from 1% to 0.4%. In this way, since the reception signal modulation degree is lowered due to the increase in power, even though sufficient power is transmitted from the reader/writer side to the card side, it is difficult to receive the signal on the reader/writer side because of the insufficient reception signal modulation degree. As a result, it is considered that a communication error is caused.

Figure 4:
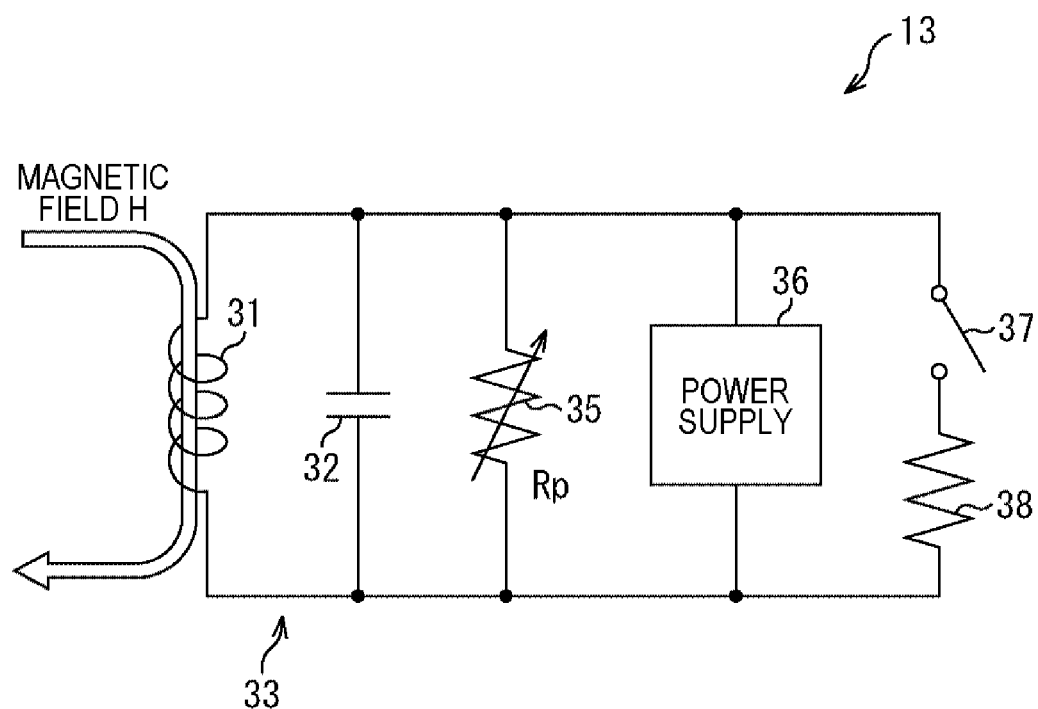
FIG. 4 is a diagram showing an equivalent circuit of a card.

FIG. 4 shows an equivalent circuit of the card 13, and a factor that reduces the reception signal modulation degree due to the increase in power will be described with reference to FIG. 4.

As shown in FIG. 4, the card 13 has a circuit configuration in which the coil 31, the capacitor 32, a variable resistor 35, a power supply 36, a switch 37, and a resistor 38 are connected.

For example, in the card 13, when a magnetic field H passing through the coil 31 becomes strong, a resistance value Rp of the variable resistor 35 is lowered for overvoltage protection, and as a result, impedance of the antenna circuit 33 is lowered.

Furthermore, in the card 13, load modulation is used in which 0/1 is transmitted by changing the impedance by turning on/off connection of the resistor 38 by the switch 37. Therefore, the smaller the impedance of the antenna circuit 33, the smaller a rate of change (modulation degree) in the load modulation. That is, in a case where the impedance of the antenna circuit 33 decreases as the power supplied to the card 13 becomes excessive, a reception signal modulation degree decreases due to the increase in power. Therefore, it is considered ineffective to apply to such a case the method of improving the communication performance in the reader/writer mode of the smartphone by increasing the power.

Then, as described above, there are various types of cards 13, and there may be a card 13 having a characteristic that requires a large amount of power, a card 13 having a characteristic that a large amount of power has an adverse effect, and the like. Therefore, in order to improve reception performance in the reader/writer mode of the smartphone, it is necessary to transmit appropriate power according to the characteristic of each card 13 by measuring the reception signal modulation degree.

Note that it is considered that the reception performance in the reader/writer mode of the smartphone can be improved by enabling demodulation even with a small modulation degree. However, it is not easy to improve the reception performance because this case corresponds to reduction of a noise component by an amount that a signal component in a signal-to-noise ratio (SN ratio) becomes small.

Configuration Example of Transmission/Reception Circuit

Figure 5:
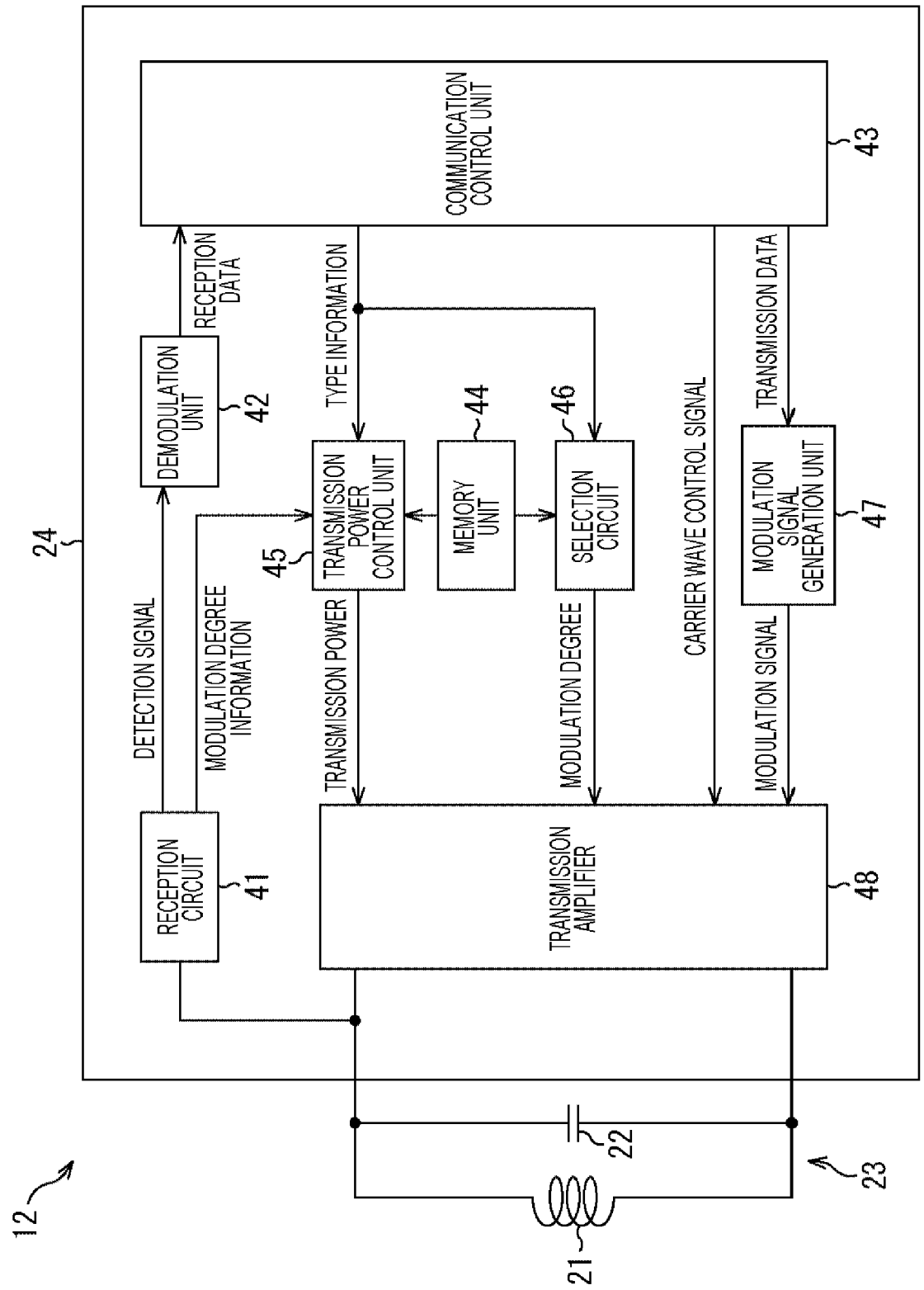
FIG. 5 is a block diagram showing a functional configuration example of a transmission/reception circuit of a reader/writer.

FIG. 5 is a block diagram showing a functional configuration example of the transmission/reception circuit 24 of the reader/writer 12.

As shown in FIG. 5, the transmission/reception circuit 24 includes a reception circuit 41, a demodulation unit 42, a communication control unit 43, a memory unit 44, a transmission power control unit 45, a selection circuit 46, a modulation signal generation unit 47, and a transmission amplifier 48.

The reception circuit 41 receives a signal transmitted by load-modulating a carrier wave output from the reader/writer 12 in the card 13 in response to a change in current generated in the antenna circuit 23, and supplies a detection signal that has detected the signal to the demodulation unit 42. Moreover, the reception circuit 41 includes a modulation degree detection unit 63 (see FIG. 13 as described later) for detecting a reception signal modulation degree, and supplies modulation degree information indicating the detected reception signal modulation degree to the transmission power control unit 45.

The demodulation unit 42 acquires data transmitted by the card 13 as reception data by demodulating the detection signal supplied from the reception circuit 41, and supplies the reception data to the communication control unit 43.

The communication control unit 43 controls communication in the reader/writer 12 on the basis of the reception data supplied from the demodulation unit 42. For example, the communication control unit 43 generates transmission data for transmission to the card 13 in response to the reception data, and supplies the transmission data to the modulation signal generation unit 47. Furthermore, the communication control unit 43 supplies the transmission power control unit 45 and the selection circuit 46 with type information indicating a type (Type A, Type B, Type F, etc.) of the card 13 specified by the reception data. Furthermore, the communication control unit 43 supplies a carrier wave control signal for controlling on/off of the carrier wave output from the reader/writer 12 to the transmission amplifier 48.

The memory unit 44 stores various types of information required for the transmission power control unit 45 and the selection circuit 46 to perform processing. For example, the memory unit 44 stores the type information and set values of the transmission power and the modulation degree in association with each other.

The transmission power control unit 45 selects transmission power according to the type of the card 13 by reading from the memory unit 44 a set value of the transmission power associated with the type information supplied from the communication control unit 43. Then, the transmission power control unit 45 sets the transmission amplifier 48 so that a signal is transmitted with the selected transmission power. Moreover, the transmission power control unit 45 controls to adjust (decrease or increase) the transmission power on the basis of the modulation degree information supplied from the reception circuit 41, as described later with reference to flowcharts in FIGS. 9 to 12.

The selection circuit 46 selects a modulation degree according to the type of the card 13 by reading from the memory unit 44 a set value of the modulation degree associated with the type information supplied from the communication control unit 43, Then, the selection circuit 46 sets the transmission amplifier 48 so that a signal is transmitted with the selected modulation degree.

The modulation signal generation unit 47 generates a modulation signal for modulating the carrier wave according to the transmission data supplied from the communication control unit 43, and supplies the modulation signal to the transmission amplifier 48.

The transmission power set or adjusted by the transmission power control unit 45 is output to the transmission amplifier 48, and the transmission amplifier supplies current to the antenna circuit 23 so that the carrier wave is generated at a timing according to the carrier wave control signal supplied from the communication control unit 43. Then, the transmission amplifier 48 modulates the carrier wave according to the modulation signal supplied from the modulation signal generation unit 47 with the modulation degree set by the selection circuit 46, so that a magnetic field generated in the coil 21 of the antenna circuit 23 is changed, and the transmission data is transmitted to the card 13.

Figure 6:
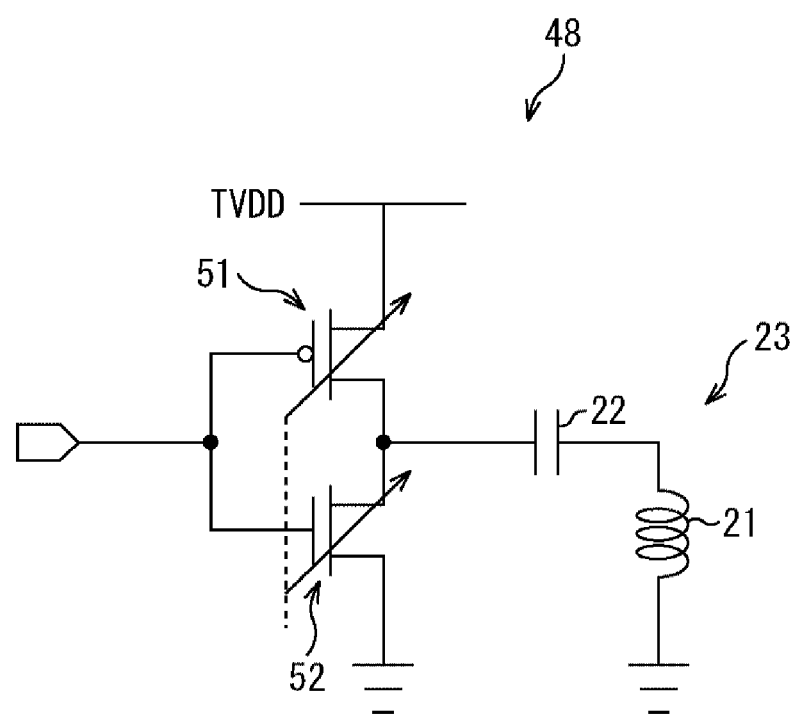
FIG. 6 is a diagram showing an example of a configuration example of a transmission amplifier.

Here, FIG. 6 shows an example of a configuration example of the transmission amplifier 48. In the transmission amplifier 48, a P-type metal oxide semiconductor field effect transistor (MOSFET) 51 and an N-type MOSFET 52 are connected between an output buffer voltage TVDD and a ground level GND. Then, the transmission amplifier 48 can adjust the transmission power by a method of adjusting the output buffer voltage TVDD, a method of adjusting impedance (ON resistance) of the MOSFET 51 and the MOSFET 52, or other methods.

In the reader/writer 12 configured in this way, the transmission power control unit 45 can adjust (decrease or increase) the transmission power transmitted to the card 13 on the basis of the reception signal modulation degree detected in the reception circuit 41. Therefore, the reader/writer 12 can transmit appropriate power according to the characteristic of each card 13, such as the card 13 having a characteristic that requires a large amount of power, the card 13 having a characteristic that a large amount of power has an adverse effect, and the like.

That is, by measuring the reception signal modulation degree, the reader/writer 12 can supply a large amount of power to a card 13 having a characteristic that requires power, and supply a small amount of power to a card 13 having a characteristic that oversupply of power causes deterioration of communication performance. Therefore, the reader/writer 12 can communicate with each card 13, and can improve performance of short-range wireless communication.

Furthermore, the reader/writer 12 can use various methods, for example, when reducing the transmission power.

Figure 7:
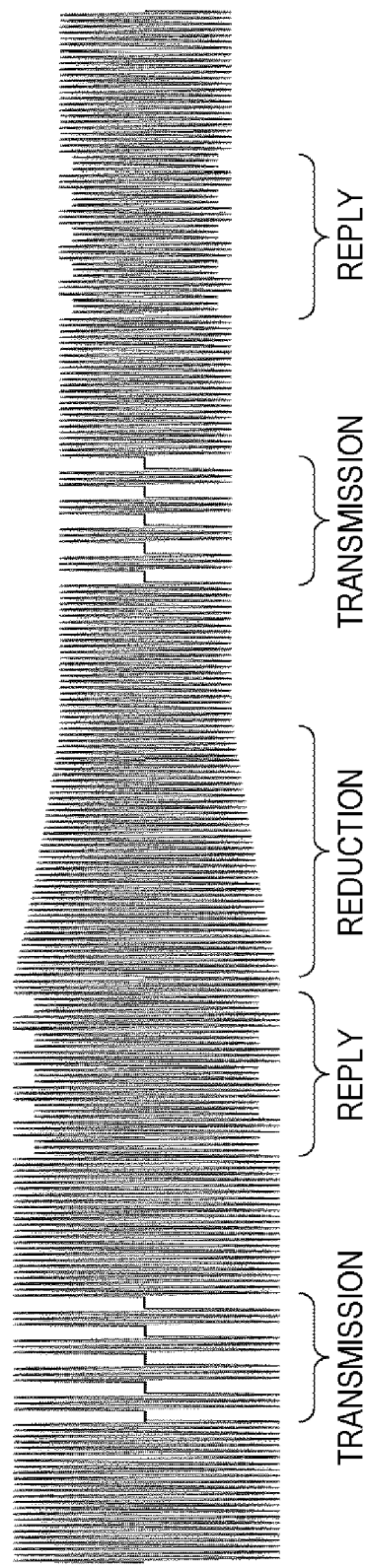
FIG. 7 is a diagram for explaining a first method of reducing transmission power.

A first method of reducing the transmission power will be described with reference to FIG. 7.

For example, the reader/writer 12 starts outputting a carrier wave with maximum transmission power, transmits a signal for searching the card 13, and then receives a reply from the card 13 to the signal. Then, the reader/writer 12 detects a reception signal modulation degree of the reply from the card 13, and reduces the transmission power in a case where the reception signal modulation degree is less than or equal to a certain threshold value. At this time, in the first method, the reader/writer 12 continuously reduces the transmission power so that a change in the transmission power is gently and gradually changed so as not to be detected by the card 13. Thereafter, the reader/writer 12 transmits a signal for searching the card 13 with the reduced transmission power.

Then, as described with reference to FIGS. 2 to 4 mentioned above, the card 13 having the characteristic that the reception signal modulation degree is lowered due to the increase in power has an increased reception signal modulation degree by lowering the transmission power output from the reader/writer 12. Thereafter, the reader/writer 12 can detect the reception signal modulation degree of the reply from the card 13, and continuously perform communication with the transmission power at that time in a case where the reception signal modulation degree is less than or equal to the certain threshold value. As described above, the reader/writer 12 can continuously reduce the transmission power in the first method.

Figure 8:
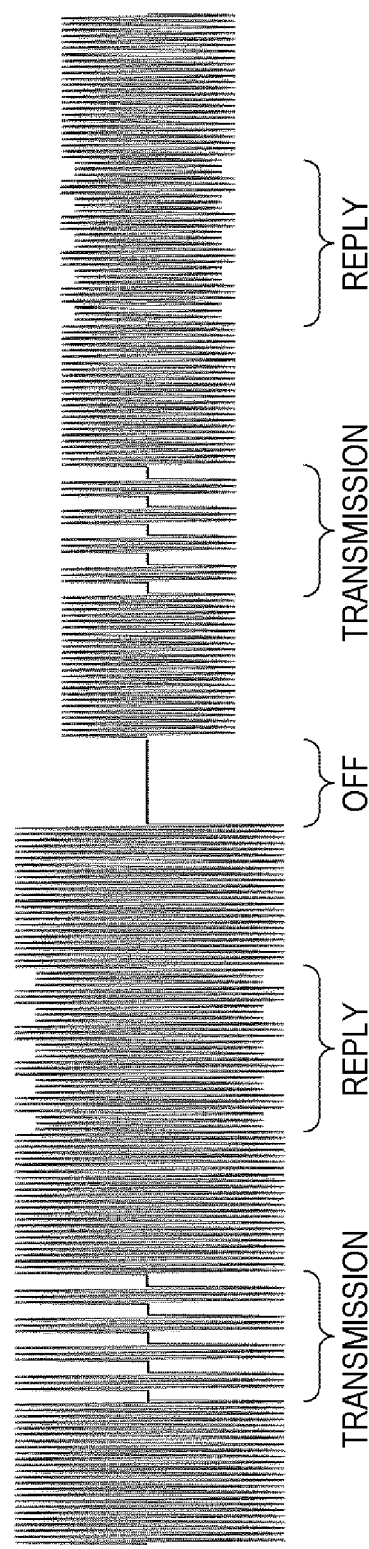
FIG. 8 is a diagram for explaining a second method of reducing the transmission power.

A second method of reducing the transmission power will be described with reference to FIG. 8.

For example, in the second method, the reader/writer 12 stops output of a carrier wave in a case where the reception signal modulation degree is less than or equal to the certain threshold value. Thereafter, the reader/writer 12 restarts the output of the carrier wave with the reduced transmission power, and transmits a signal for searching the card 13. Thus, in the second method, the reader/writer 12 can temporarily turn off the output of the carrier wave to discontinuously reduce the transmission power.

In this way, the reader/writer 12 can continuously reduce the transmission power or discontinuously reduce the transmission power when reducing the transmission power. Of course, the reader/writer 12 may reduce the transmission power by other methods.

Processing Example of Transmission Power Control Processing

A first processing example of transmission power control processing executed in the transmission/reception circuit 24 will be described with reference to a flowchart shown in FIG. 9.

For example, the transmission power control processing is performed at the start of communication processing of searching for and communicating with the card 13 existing in a range where short-range wireless communication is possible. In step S11, since it is unknown whether or not the card 13 exists in the range where the short-range wireless communication is possible, the transmission power control unit 45 sets the transmission amplifier 48 so that a maximum value is set as an initial set value.

In step S12, the modulation signal generation unit 47 generates a modulation signal for transmitting a signal for searching the card 13, and supplies the modulation signal to the transmission amplifier 48. Then, the transmission amplifier 48 modulates a carrier wave according to the modulation signal supplied from the modulation signal generation unit 47 and transmits a signal for searching the card 13 with the transmission power set in step S11.

In step S13, the communication control unit 43 determines whether or not a reply to the signal transmitted in step S12 has been detected on the basis of reception data supplied from the demodulation unit 42. For example, the communication control unit 43 determines that the reply has been detected in a case where the reception data includes a response transmitted from the card 13 to the signal for searching the card 13.

For example, in step S13, in a case where the communication control unit 43 determines that the reply has not been detected, it is assumed that the card 13 does not exist in the range where the short-range wireless communication is possible, and the transmission power control processing is terminated. Note that, in this case, the short-range wireless communication is not performed after that.

On the other hand, in a case where the communication control unit 43 determines in step S13 that the reply has been detected, the processing proceeds to step S14.

In step S14, the transmission power control unit 45 measures a reception signal modulation degree of the reply transmitted from the card 13 on the basis of modulation degree information supplied from the reception circuit 41.

In step S15, the transmission power control unit 45 determines whether or not the reception signal modulation degree is less than or equal to a preset certain threshold value on the basis of a detection result of the reception signal modulation degree in step S14.

For example, in step S15, in a case where the transmission power control unit 45 determines that the reception signal modulation degree is not less than or equal to the threshold value (that is, greater than the threshold value), it is assumed that both the transmission power and reception performance are sufficient and good short-range wireless communication can be realized, and the transmission power control processing is terminated. Then, in this case, the short-range wireless communication is performed while maintaining setting of current transmission power.

On the other hand, in a case where the transmission power control unit 45 determines in step S15 that the reception signal modulation degree is less than or equal to the threshold value, it is considered that demodulation can be difficult, and the processing proceeds to step S16.

In step S16, the transmission power control unit 45 determines whether or not the current transmission power is set to a minimum value, and in a case where it is determined that the transmission power is not set to the minimum value, the processing proceeds to step S17.

In step S17, the transmission power control unit 45 sets the transmission amplifier 48 so as to reduce the transmission power, as described with reference to FIG. 7 or FIG. 8 mentioned above. Thereafter, the transmission amplifier 48 transmits a signal for searching the card 13 with newly set transmission power, similarly to step S12. Then, after the processing of step S17, the processing returns to step S13, and similar processing is repeated thereafter.

On the other hand, in step S16, in a case where the transmission power control unit 45 determines that the transmission power is set to the minimum value, the transmission power control processing is terminated. For example, in this case, the short-range wireless communication can be performed by setting the transmission power when a maximum reception signal modulation degree has been measured.

Since the transmission/reception circuit 24 executes the transmission power control processing as described above, the reader/writer 12 can transmit appropriate power to the cards 13 having various characteristics by measuring the reception signal modulation degree. Therefore, the reader/writer 12 can communicate with both the card 13 having a characteristic that requires power and the card 13 having a characteristic that oversupply of power causes deterioration of communication performance, and performance of the short-range wireless communication can be improved.

A second processing example of the transmission power control processing executed in the transmission/reception circuit 24 will be described with reference to a flowchart shown in FIG. 10.

Figure 9:
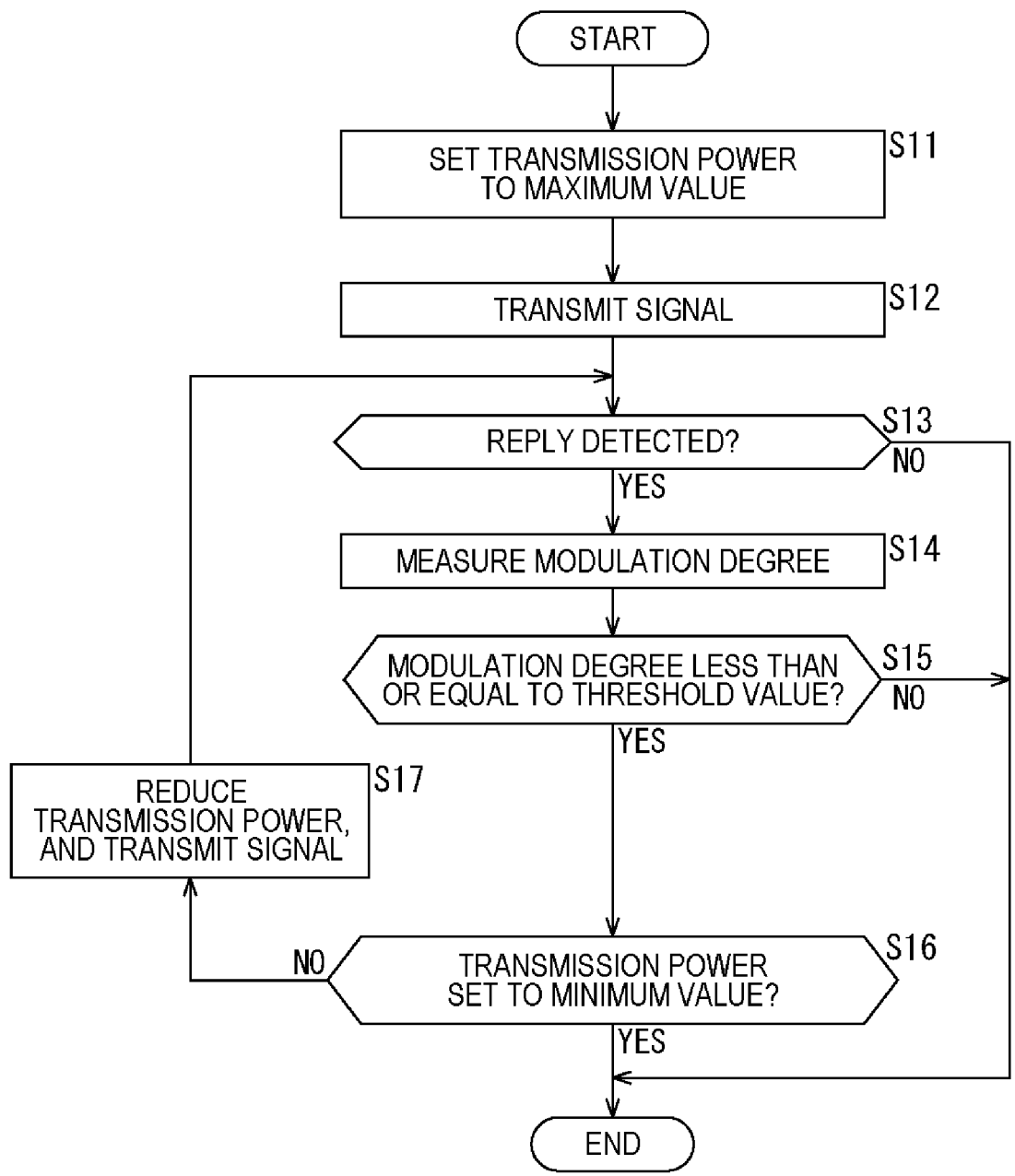
FIG. 9 is a flowchart for explaining a first processing example of transmission power control processing.

In steps S21 to S23, processing similar to that in steps S11 to S13 of FIG. 9 is performed. Then, in step S23, in a case where the communication control unit 43 determines that a reply has not been detected, the processing proceeds to step S24.

In step S24, the transmission power control unit 45 sets the transmission amplifier 48 so as to reduce transmission power, as described with reference to FIGS. 7 and 8 described above. Thereafter, the transmission amplifier 48 transmits a signal for searching the card 13 with newly set transmission power, similarly to step S22. That is, at this time, in order to deal with a case where the reply could not be detected because a reception signal modulation degree becomes small in the card 13 having a characteristic that large transmission power has an adverse effect, the transmission power is reduced and the signal is retransmitted.

In step S25, the communication control unit 43 determines whether or not a reply to the signal transmitted in step S24 has been detected on the basis of reception data supplied from the demodulation unit 42.

For example, in step S25, in a case where the communication control unit 43 determines that the reply has not been detected, it is assumed that the card 13 does not exist in a range where short-range wireless communication is possible, and the transmission power control processing is terminated. That is, at this time, it can be determined that the reply is not detected even if the transmission power is reduced and the signal is retransmitted, and that there is no card 13 having a characteristic that the large transmission power has an adverse effect. Note that, in this case, the short-range wireless communication is not performed after that.

On the other hand, in a case where the communication control unit 43 determines in step S25 that the reply has been detected, the processing proceeds to step S26.

Thereafter, in steps S26 to S29, processing similar to that in steps S14 to S17 of FIG. 9 is repeated.

Since the transmission/reception circuit 24 executes the transmission power control processing as described above, the reader/writer 12 can deal with the case where the reply of the card 13 having the characteristic that oversupply of power causes deterioration of communication performance could not be detected at the time of the first transmission of the signal for searching the card 13 (step S22). That is, in the transmission power control processing of FIG. 9, the processing has been completed in such a case, but in the transmission power control processing of FIG. 10, communication with the card 13 having the characteristic that the oversupply of power causes deterioration of the communication performance is attempted by adding the processing of reducing the transmission power and transmitting the signal (step S24).

Therefore, the reader/writer 12 can further improve the performance of short-range wireless communication.

A third processing example of the transmission power control processing executed in the transmission/reception circuit 24 will be described with reference to a flowchart shown in FIG. 11.

In step S31, the transmission power control unit 45 sets the transmission amplifier 48 so that transmission power becomes an intermediate value as an initial set value.

In steps S32 and S33, processing similar to that in steps S12 and S13 of FIG. 9 is performed. Then, in step S33, in a case where the communication control unit 43 determines that a reply has not been detected, the processing proceeds to step S34.

In step S34, the transmission power control unit 45 sets the transmission amplifier 48 so as to increase the transmission power, and the transmission amplifier 48 transmits a signal for searching the card 13 with newly set transmission power, similarly to step S32. That is, at this time, in order to deal with a case where the card 13 having a characteristic that requires a large amount of power could not reply with the transmission power of the intermediate value, the transmission power is increased and the signal is retransmitted.

Figure 10:
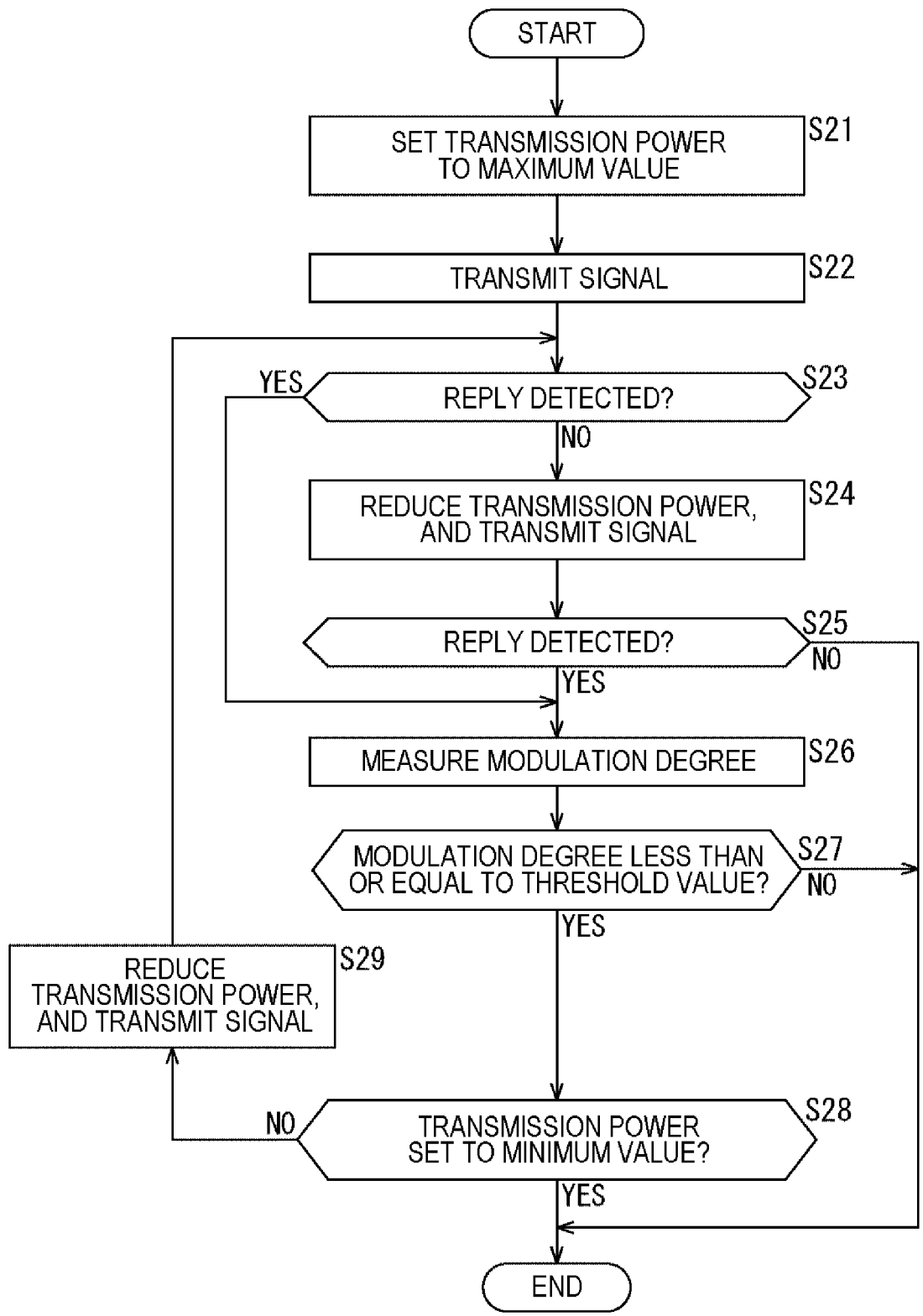
FIG. 10 is a flowchart for explaining a second processing example of the transmission power control processing.

Thereafter, in steps S35 to S39, processing similar to that in steps S25 to S29 of FIG. 10 is repeated.

Since the transmission/reception circuit 24 executes the transmission power control processing as described above, the reader/writer 12 can deal with the case where the reply of the card 13 having the characteristic that requires power could not be detected at the time of the first transmission of the signal for searching the card 13 (step S32). That is, the reader/writer 12 can reconfirm presence/absence of the card 13 having the characteristic that requires power (step S34). Therefore, the reader/writer 12 can further improve the performance of short-range wireless communication.

Figure 11:
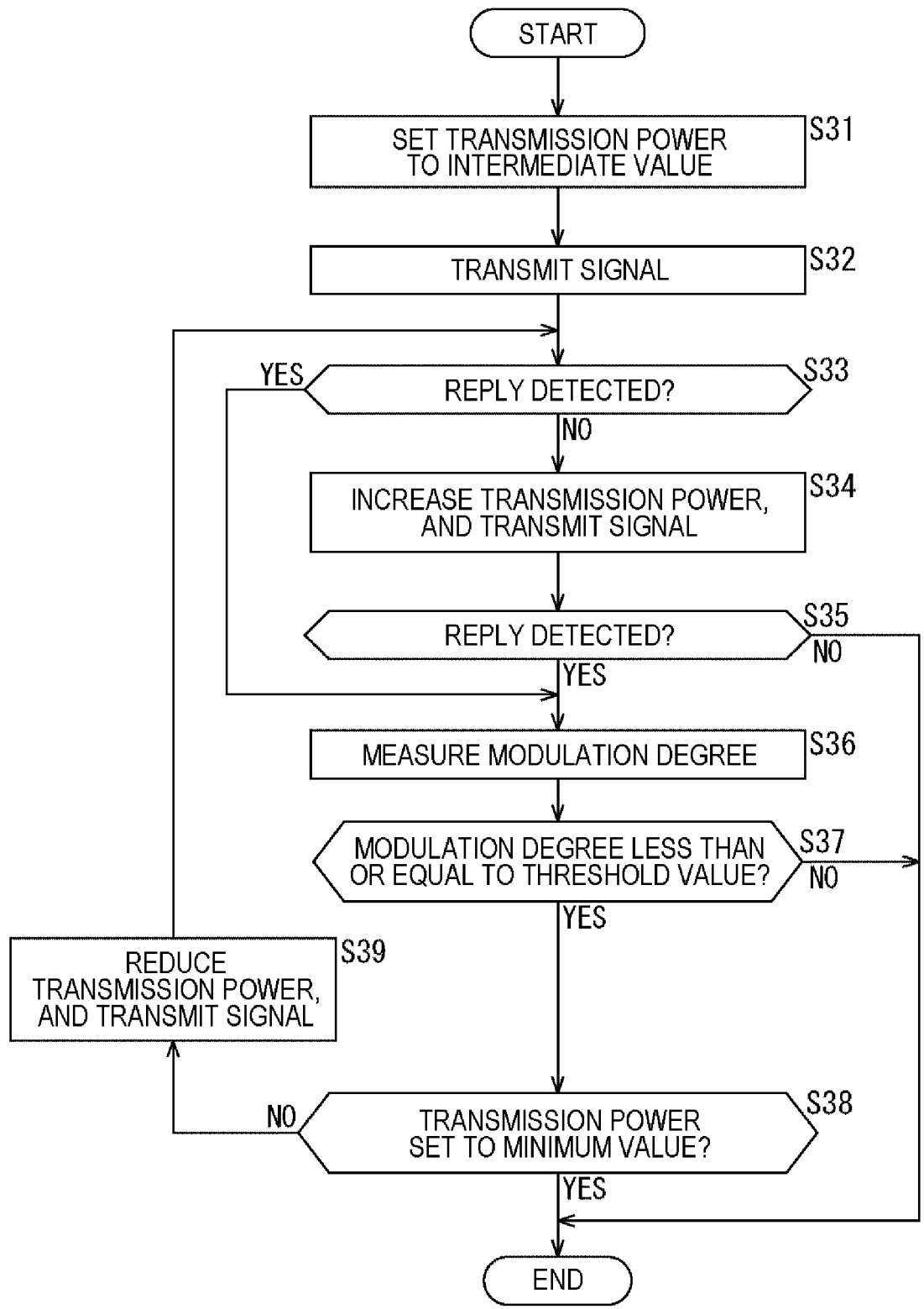
FIG. 11 is a flowchart for explaining a third processing example of the transmission power control processing.

Moreover, in the transmission power control processing of FIG. 11, power consumption of the reader/writer 12 can be suppressed as compared with the transmission power control processing of FIG. 9, for example, by not setting a maximum value to the initial set value of the transmission power.

Figure 12:
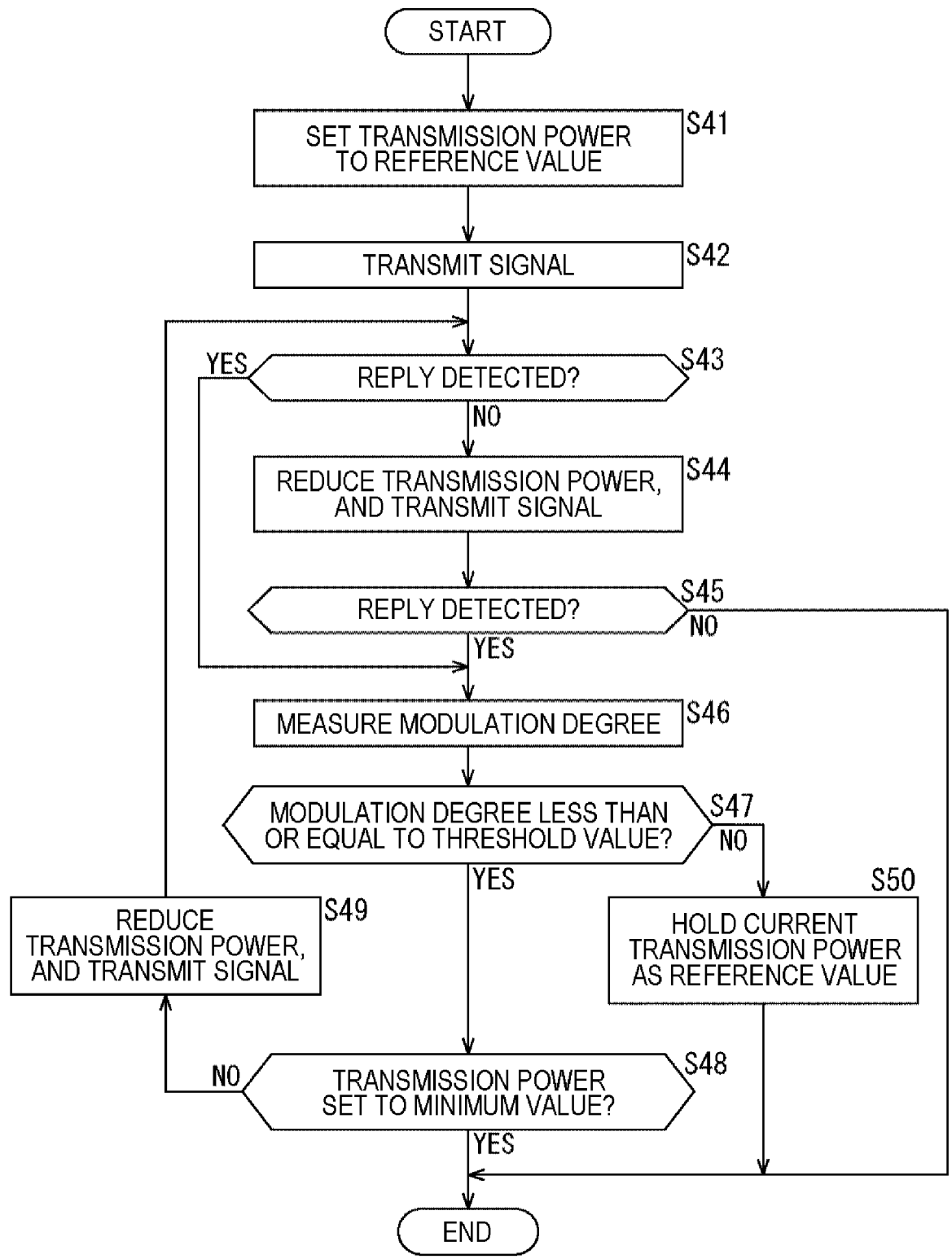
FIG. 12 is a flowchart for explaining a fourth processing example of the transmission power control processing.

A fourth processing example of the transmission power control processing executed in the transmission/reception circuit 24 will be described with reference to a flowchart shown in FIG. 12.

In step S41, the transmission power control unit 45 sets the transmission amplifier 48 so that transmission power becomes a reference value as an initial set value. For example, in a case where a type of the card 13 for which the reader/writer 12 performs short-range wireless communication is limited, transmission power appropriate for a type of the card 13 is stored in the memory unit 44 as the reference value.

Thereafter, in steps S42 to S49, processing similar to that in steps S22 to S29 of FIG. 10 is repeated.

However, in a case where the transmission power control unit 45 determines in step S47 that a reception signal modulation degree is not less than or equal to a threshold value (that is, larger than the threshold value), the processing proceeds to step S50.

In step S50, the communication control unit 43 holds current transmission power as the reference value, newly stores it in the memory unit 44, and the transmission power control processing is ended. That is, in a case where a reply of the card 13 is not detected by the transmission power of the reference value and thereafter, the reply is detected after the transmission power is reduced, it can be determined that the card 13 suitable for the transmission power at that time is an object of short-range wireless communication. Therefore, by holding the current transmission power as the reference value, it is possible to detect a reply to first transmission of a signal for searching the card 13 (step S42) in the next transmission power control processing.

By executing the transmission power control processing as described above by the transmission/reception circuit 24, the reader/writer 12 can perform processing more efficiently in a case where the type of the card 13 to be the object of the short-range wireless communication is limited. Moreover, even if the card 13 having a characteristic different from the reference value becomes the object of the short-range wireless communication, the reader/writer 12 can update at any time transmission power appropriate for the card 13 as the reference value.

In this way, the reader/writer 12 can improve performance of short-range wireless communication.

Configuration Example of Reception Circuit

A configuration example of the reception circuit 41 will be described with reference to FIG. 13.

Figure 13:
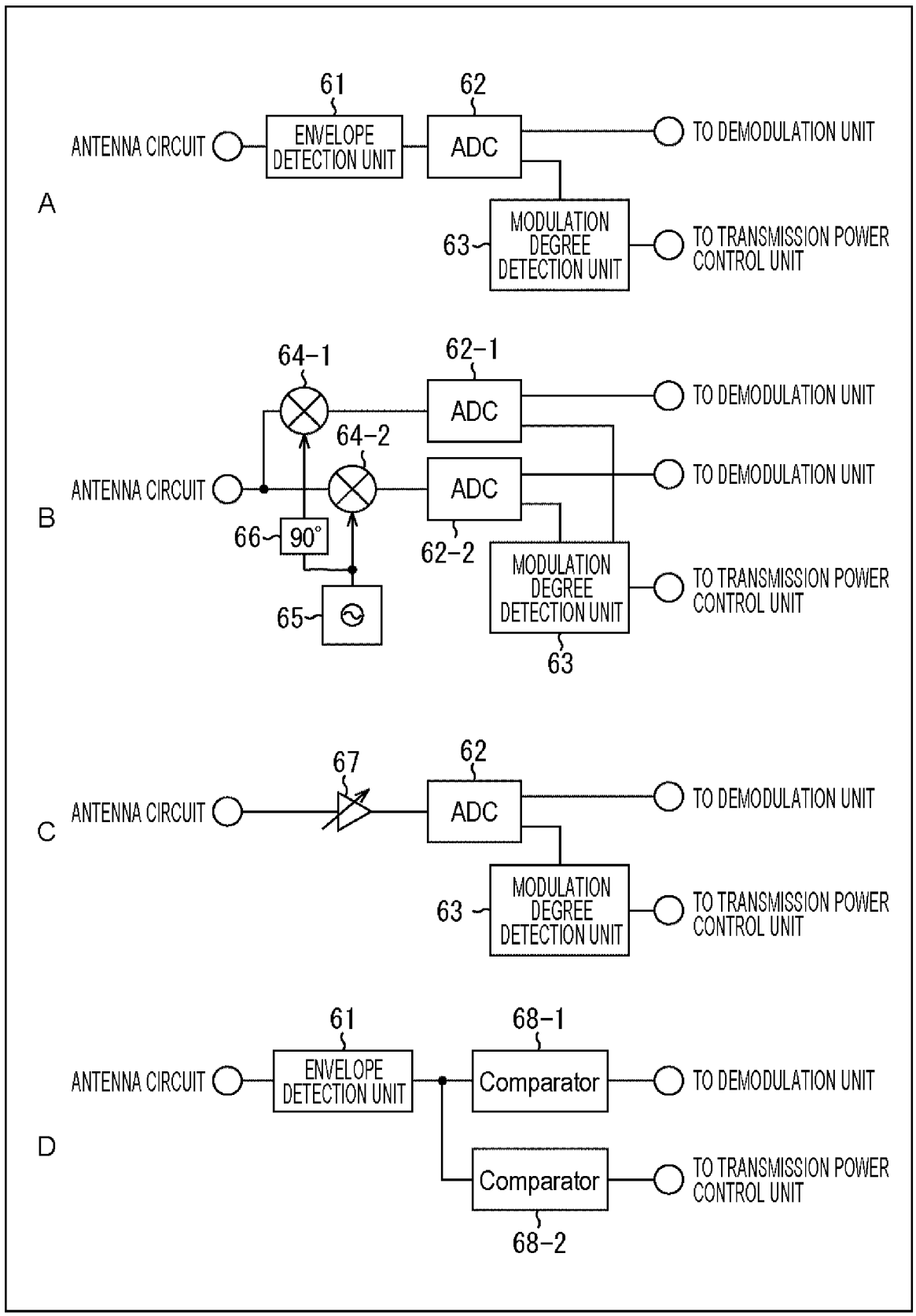
FIG. 13 is a diagram showing a configuration example of a reception circuit.

A of FIG. 13 shows a first configuration example of the reception circuit 41.

The reception circuit 41 shown in A of FIG. 13 includes an envelope detection unit 61, an analog to digital converter (ADC) 62, and the modulation degree detection unit 63.

For example, in this reception circuit 41, a signal supplied from the antenna circuit 23 is detected by the envelope detection unit 61, and an analog detection signal representing an envelope of the signal is AD-converted by the ADC 62. Then, the AD-converted detection signal in the ADC 62 is supplied to the modulation degree detection unit 63 as well as to the demodulation unit 42 in FIG. 5, a reception signal modulation degree is detected on the basis of the detection signal, and modulation degree information indicating the reception signal modulation degree is supplied to the transmission power control unit 45 in FIG. 5.

As described above, the reception circuit 41 can adopt a configuration in which AD conversion is performed in the ADC 62 after detection in the envelope detection unit 61.

B of FIG. 13 shows a second configuration example of the reception circuit 41.

The reception circuit 41 shown in B of FIG. 13 includes ADCs 62-1 and 62-2, the modulation degree detection unit 63, multipliers 64-1 and 64-2, a local transmitter 65, and a 90° phase shifter 66.

For example, in this reception circuit 41, a signal supplied from the antenna circuit 23 and a signal output from the local transmitter 65 and phase-shifted in the 90° phase shifter 66 are multiplied in the multiplier 64-1 and supplied to the ADC 62-1. Furthermore, the signal supplied from the antenna circuit 23 and the signal output from the local transmitter 65 are multiplied in the multiplier 64-2 and supplied to the ADC 62-2. Then, AD-converted signals in the ADCs 62-1 and 62-1 are supplied to the demodulation unit 42 in FIG. 5 as detection signals. Moreover, the AD-converted signals in the ADCs 62-1 and 62-1 are supplied to the modulation degree detection unit 63, a reception signal modulation degree is detected on the basis of those detection signals, and modulation degree information indicating the reception signal modulation degree is supplied to the transmission power control unit 45 in FIG. 5.

In this way, the reception circuit 41 can adopt a configuration in which AD conversion is performed in the ADC 62 after orthogonal detection in the multipliers 64-1 and 64-2.

C of FIG. 13 shows a third configuration example of the reception circuit 41.

The reception circuit 41 shown in C of FIG. 13 includes the ADC 62, the modulation degree detection unit 63, and a variable amplifier 67.

For example, in this reception circuit 41, a signal supplied from the antenna circuit 23 is supplied to the ADC 62 after amplitude is adjusted via the variable amplifier 67, and an AD-converted signal is supplied to the modulation degree detection unit 63 as well as to the demodulation unit 42 in FIG. 5. Therefore, a reception signal modulation degree is detected directly in the modulation degree detection unit 63 from an AD-converted waveform of the signal received by the antenna circuit 23, and modulation degree information indicating the reception signal modulation degree is supplied to the transmission power control unit 45 in FIG. 5.

In this way, the reception circuit 41 can adopt a configuration in which the signal supplied from the antenna circuit 23 is directly AD-converted.

D of FIG. 13 shows a fourth configuration example of the reception circuit 41.

The reception circuit 41 shown in D of FIG. 13 includes the envelope detection unit 61 and comparators 68-1 and 68-2.

For example, in this reception circuit 41, a signal supplied from the antenna circuit 23 is detected in the envelope detection unit 61, and an analog detection signal representing an envelope of the signal is supplied to the comparators 68-1 and 68-2. Then, a signal output from the comparator 68-1 is supplied to the demodulation unit 42 in FIG. 5, and a signal output from the comparator 68-2 is supplied to the transmission power control unit 45 in FIG. 5.

In this way, in the reception circuit 41, the signal supplied from the antenna circuit 23 is received in analog.

Note that the configuration adopted by the reception circuit 41 is not limited to each configuration example as shown in FIG. 13, and various configurations can be adopted.

Furthermore, as shown in FIG. 5, the transmission/reception circuit 24 is configured so that the detection signal is supplied from the reception circuit 41 to the demodulation unit 42. For example, a configuration in which the reception circuit 41 and the demodulation unit 42 are integrally provided may be adopted. That is, the transmission/reception circuit 24 can be configured so as to simultaneously perform detection of the modulation degree and demodulation.

Similarly, the transmission/reception circuit 24 may be configured such that the communication control unit 43 can have a function as the transmission power control unit 45, and the modulation degree information is supplied to the communication control unit 43 in this configuration.

Moreover, in the transmission/reception circuit 24, the detection of the modulation degree may be performed either in analog or digital.

Configuration Example of Computer

Figure 14:
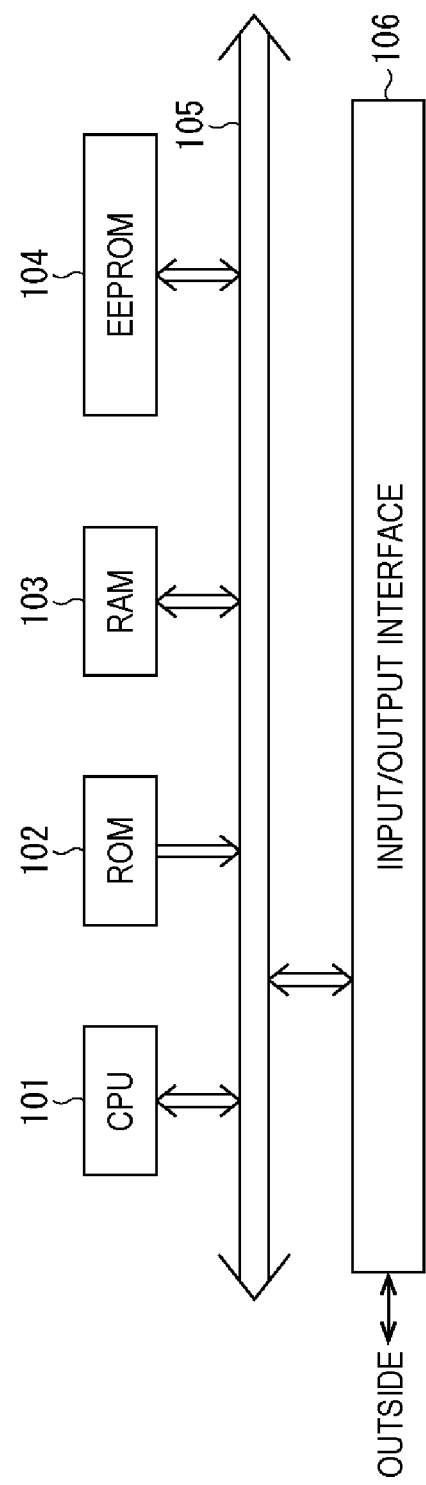
FIG. 14 is a block diagram showing a configuration example of an embodiment of a computer to which the present technology is applied.

FIG. 14 is a block diagram illustrating a configuration example of hardware of a computer that executes the above-described series of processing by a program.

In the computer, a central processing unit (CPU) 101, a read only memory (ROM) 102, a random access memory (RAM) 103, and an electronically erasable and programmable read only memory (EEPROM) 104 are connected to each other by a bus 105. Moreover, an input/output interface 106 is connected to the bus 105, and the input/output interface 106 is connected to the outside.

In the computer configured as described above, for example, the CPU 101 loads a program stored in the ROM 102 and the EEPROM 104 into the RAM 103 via the bus 105 and executes the program, whereby the above-described series of processing is performed. Furthermore, the program executed by the computer (CPU101) can be written in advance in the ROM 102, and can be installed or updated in the EEPROM 104 from the outside via the input/output interface 106.

Here, in the present specification, the processing performed by the computer according to the program does not necessarily have to be performed in time series in the order described as the flowcharts. In other words, the processing performed by the computer according to the program also includes processing executed in parallel or individually (for example, parallel processing or object processing).

Furthermore, the program may be processed by one computer (processor) or may be distributed and processed by a plurality of computers. Moreover, the program may be transferred to a distant computer and executed.

Moreover, in the present specification, the system means a set of a plurality of components (devices, modules (parts), and the like), and it does not matter whether or not all the components are in the same housing. Therefore, a plurality of devices housed in separate housings and connected via a network, and one device housing a plurality of modules in one housing are both systems.

Furthermore, for example, the configuration described as one device (or processing unit) may be divided and configured as a plurality of devices (or processing units). On the contrary, the configurations described above as a plurality of devices (or processing units) may be collectively configured as one device (or processing unit). Furthermore, of course, a configuration other than the above may be added to the configuration of each device (or each processing unit). Moreover, if the configuration and operation of the entire system are substantially the same, a part of the configuration of one device (or processing unit) may be included in the configuration of another device (or another processing unit).

Furthermore, for example, the present technology can be configured as cloud computing in which one function is shared and jointly processed by a plurality of devices via a network.

Furthermore, for example, the above-mentioned program can be executed in any device. In that case, the device is only required to have necessary functions (functional blocks and the like) and obtain necessary information.

Furthermore, for example, each step described in the above-described flowcharts can be executed by one device or shared and executed by a plurality of devices. Moreover, in a case where one step includes a plurality of processing, the plurality of processing included in the one step can be executed by one device or shared and executed by a plurality of devices. In other words, a plurality of processing included in one step can be executed as processing of a plurality of steps. On the contrary, the processing described as a plurality of steps can be collectively executed as one step.

Note that, in the program executed by the computer, processing of steps for describing the program may be executed in time series in the order described in the present specification, or may be executed in parallel or individually at necessary timing such as when a call is made, and the like. That is, as long as there is no contradiction, the processing of each step may be executed in an order different from the above-mentioned order. Moreover, the processing of the steps for describing this program may be executed in parallel with processing of another program, or may be executed in combination with the processing of the other program.

Note that the plurality of the present technologies described in the present specification can be implemented independently and separately as long as there is no contradiction. Of course, any plurality of the present technologies can be implemented in combination. For example, some or all of the present technologies described in any embodiment can be implemented in combination with some or all of the technologies described in other embodiments. Furthermore, it is also possible to carry out some or all of any of the above-mentioned present technologies in combination with other technologies not described above.

Combination Example of Configurations

Note that the present technology can also have the following configurations.

(1)
A communication apparatus including:
a reception circuit that receives a signal transmitted by load-modulating in a communication device, which is a partner in short-range wireless communication, via an antenna,
in which the reception circuit measures a modulation degree of the signal.

(2)
The communication apparatus according to (1) described above, further including:
a transmission power control unit that controls transmission power to be transmitted to the communication device on the basis of a reception signal modulation degree, which is the modulation degree of the signal.

(3)
The communication apparatus according to (2) described above,
in which the transmission power control unit performs control so as to reduce the transmission power in a case where the reception signal modulation degree is less than or equal to a certain threshold value.

(4)
The communication apparatus according to (2) or (3) described above,
in which the transmission power control unit controls the transmission power by adjusting impedance of a transmission amplifier that outputs the transmission power.

(5)
The communication apparatus according to (2) or (3) described above,
in which the transmission power control unit controls the transmission power by adjusting voltage of a transmission amplifier that outputs the transmission power.

(6)
The communication apparatus according to any one of (3) to (5) described above,
in which a search signal for searching the communication device is transmitted,
the reception signal modulation degree is measured in a case where a reply to the signal has been detected, and
the search signal is retransmitted depending on whether or not the reception signal modulation degree is less than or equal to the threshold value.

(7)
The communication apparatus according to (6) described above,
in which the transmission power control unit sets the transmission power to a maximum value when the search signal for the first time is transmitted.

(8)
The communication apparatus according to (7) described above,
in which the transmission power control unit performs control so as to reduce the transmission power in a case where a reply to the search signal for the first time has not been detected.

(9)
The communication apparatus according to (6) described above,
in which the transmission power control unit sets the transmission power to an intermediate value when the search signal for the first time is transmitted, and performs control to increase the transmission power in a case where a reply to the search signal for the first time has not been detected.

(10)
The communication apparatus according to (6) described above,
in which the transmission power control unit sets the transmission power to a reference value appropriate for the communication device of a predetermined type when the search signal for the first time is transmitted.

(11)
The communication apparatus according to any one of (6) to (10) described above,
in which after the search signal is transmitted, the transmission power control unit continuously reduces the transmission power gently so that a change in the transmission power is not detected by the communication device in a case where the reception signal modulation degree is less than or equal to the certain threshold value.

(12)

The communication apparatus according to any one of (6) to (11) described above, in which after the search signal is transmitted, the transmission power control unit stops output of a carrier wave and restarts the output of the carrier wave with the reduced transmission power in a case where the reception signal modulation degree is less than or equal to the certain threshold value.

(13)

A communication method including:

by a communication apparatus, receiving a signal transmitted by load-modulating in a communication device, which is a partner in short-range wireless communication, via an antenna, in which a modulation degree of the signal is measured.

(14)

A program that causes a computer of a communication apparatus to execute communication processing, including:

receiving a signal transmitted by load-modulating in a communication device, which is a partner in short-range wireless communication, via an antenna, in which a modulation degree of the signal is measured.

Note that the present embodiment is not limited to the above-described embodiment, and various modifications can be made without departing from the gist of the present disclosure. Furthermore, the effects described in the present specification are merely examples and are not limited, and there may be other effects.

REFERENCE SIGNS LIST

11 NFC communication system
12 Reader/writer
13 Card
21 Coil
22 Capacitor
23 Antenna circuit
24 Transmission/reception circuit
31 Coil
32 Capacitor
33 Antenna circuit
34 Transmission/reception circuit
35 Variable resistor
36 Power supply
37 Switch
38 Resistor
41 Reception circuit
42 Demodulation unit
43 Communication control unit
44 Memory unit
46 Transmission power control unit
46 Selection circuit
47 Modulation signal generation unit
48 Transmission amplifier
51 and 52 MOSFET
61 Envelope detection unit
62 ADC
63 Modulation degree detection unit
64 Multiplier
65 Local transmitter
66 90° phase shifter
67 Variable amplifier
68 Comparator

The invention claimed is:

1. A communication apparatus comprising:

a reception circuit that receives a signal transmitted by load-modulating in a communication device, which is a partner in short-range wireless communication, via an antenna, wherein the reception circuit measures a modulation degree of the signal; and a transmission power control unit that controls transmission power to be transmitted to the communication device on a basis of a reception signal modulation degree, which is the modulation degree of the signal.

2. The communication apparatus according to claim 1, wherein the transmission power control unit performs control so as to reduce the transmission power in a case where the reception signal modulation degree is less than or equal to a threshold value.

3. The communication apparatus according to claim 1, wherein the transmission power control unit controls the transmission power by adjusting impedance of a transmission amplifier that outputs the transmission power.

4. The communication apparatus according to claim 1, wherein the transmission power control unit controls the transmission power by adjusting voltage of a transmission amplifier that outputs the transmission power.

5. The communication apparatus according to claim 2, wherein a search signal for searching the communication device is transmitted, the reception signal modulation degree is measured in a case where a reply to the signal has been detected, and the search signal is retransmitted depending on whether or not the reception signal modulation degree is less than or equal to the threshold value.

6. The communication apparatus according to claim 5, wherein the transmission power control unit sets the transmission power to a maximum value when the search signal for a first time is transmitted.

7. The communication apparatus according to claim 6, wherein the transmission power control unit performs control so as to reduce the transmission power in a case where a reply to the search signal for the first time has not been detected.

8. The communication apparatus according to claim 5, wherein the transmission power control unit sets the transmission power to an intermediate value when the search signal for a first time is transmitted, and performs control to increase the transmission power in a case where a reply to the search signal for the first time has not been detected.

9. The communication apparatus according to claim 5, wherein the transmission power control unit sets the transmission power to a reference value appropriate for the communication device of a predetermined type when the search signal for a first time is transmitted.

10. The communication apparatus according to claim 5, wherein after the search signal is transmitted, the transmission power control unit continuously reduces the transmission power gently so that a change in the transmission power is not detected by the communication device in a case where the reception signal modulation degree is less than or equal to the threshold value.

11. The communication apparatus according to claim 5, wherein after the search signal is transmitted, the transmission power control unit stops output of a carrier wave and restarts the output of the carrier wave with the reduced transmission power in a case where the reception signal modulation degree is less than or equal to the threshold value.

12. A communication method comprising:
by a communication apparatus, receiving a signal transmitted by load-modulating in a communication device, which is a partner in short-range wireless communication, via an antenna, wherein a modulation degree of the signal is measured; and
performing a transmission power control that controls transmission power to be transmitted to the communication device on a basis of a reception signal modulation degree, which is the modulation degree of the signal.

13. A non-transitory computer readable medium storing a program for executing communication processing, the program being executable by at least one processor to perform operations comprising:
receiving a signal transmitted by load-modulating in a communication device, which is a partner in short-range wireless communication, via an antenna, wherein a modulation degree of the signal is measured; and
performing a transmission power control that controls transmission power to be transmitted to the communication device on a basis of a reception signal modulation degree, which is the modulation degree of the signal.

14. The non-transitory computer readable medium according to claim 13, wherein performing the transmission power control including performing control so as to reduce the transmission power in a case where the reception signal modulation degree is less than or equal to a threshold value.

15. The non-transitory computer readable medium according to claim 13, wherein performing the transmission power control includes controlling the transmission power by adjusting impedance of a transmission amplifier that outputs the transmission power.

16. The non-transitory computer readable medium according to claim 13, wherein performing the transmission power control includes controlling the transmission power by adjusting voltage of a transmission amplifier that outputs the transmission power.

17. The non-transitory computer readable medium according to claim 14,
wherein a search signal for searching the communication device is transmitted,
the reception signal modulation degree is measured in a case where a reply to the signal has been detected, and
the search signal is retransmitted depending on whether or not the reception signal modulation degree is less than or equal to the threshold value.

18. The non-transitory computer readable medium according to claim 17, wherein performing the transmission power control includes setting the transmission power to a maximum value when the search signal for a first time is transmitted.

19. The non-transitory computer readable medium according to claim 18, wherein performing the transmission power control includes performing control so as to reduce the transmission power in a case where a reply to the search signal for the first time has not been detected.

* * * * *